United States Patent
Oguri et al.

(10) Patent No.: US 12,541,208 B2
(45) Date of Patent: Feb. 3, 2026

(54) VEHICLE SYSTEM WITH REMOTE OPERATION MODE TRANSITION CONTROL

(71) Applicant: TOYOTA JIDOSHA KABUSHIKI KAISHA, Toyota (JP)

(72) Inventors: Haruki Oguri, Toyota (JP); Kenichi Yamada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/418,521

(22) Filed: Jan. 22, 2024

(65) Prior Publication Data

US 2024/0338029 A1    Oct. 10, 2024

(30) Foreign Application Priority Data

Apr. 5, 2023  (JP) .................................. 2023-061425

(51) Int. Cl.
*B60W 60/00* (2020.01)
*B60W 50/08* (2020.01)
*G05D 1/227* (2024.01)

(52) U.S. Cl.
CPC ........... *G05D 1/227* (2024.01); *B60W 50/082* (2013.01); *B60W 60/005* (2020.02)

(58) Field of Classification Search
None
See application file for complete search history.

(56) References Cited

U.S. PATENT DOCUMENTS

| | | | | |
|---|---|---|---|---|
| 5,448,479 A | * | 9/1995 | Kemner | G05D 1/0061 |
| | | | | 701/2 |
| 2019/0064805 A1 | * | 2/2019 | Frazzoli | G05D 1/0061 |
| 2019/0299927 A1 | | 10/2019 | Ando | |
| 2021/0237765 A1 | | 8/2021 | Ando | |
| 2021/0237766 A1 | | 8/2021 | Suzuki et al. | |
| 2023/0205181 A1 | * | 6/2023 | Kishikawa | G05D 1/0038 |
| | | | | 701/2 |
| 2023/0367309 A1 | * | 11/2023 | Patel | G05D 1/0022 |
| 2023/0384784 A1 | * | 11/2023 | Heyl | H04W 12/069 |

FOREIGN PATENT DOCUMENTS

| | | |
|---|---|---|
| JP | 2019-177808 A | 10/2019 |
| JP | 2019-185293 A | 10/2019 |
| JP | 2021-060765 A | 4/2021 |
| JP | 2021-123135 A | 8/2021 |
| JP | 2021-123138 A | 8/2021 |
| WO | WO2003074894 A2 * | 9/2003 |

* cited by examiner

*Primary Examiner* — Brian P Sweeney
*Assistant Examiner* — David Hatch
(74) *Attorney, Agent, or Firm* — SoraIP, Inc.

(57) ABSTRACT

A vehicle includes an autonomous driving system and a vehicle platform that controls the vehicle according to commands from the automated driving system. The autonomous driving system is configured to send to the vehicle platform commands for autonomous driving, which is autonomous driving of the vehicle alone, and commands for remote driving, which is automatic driving based on signals from outside the vehicle. The vehicle is configured to be operable in an automatic mode, in which the vehicle platform is under control of an autonomous driving system, and in a manual mode, in which the vehicle is under control of a driver. When the vehicle is not in remote operation, switching to remote operation is allowed in manual mode and prohibited in automatic mode.

5 Claims, 6 Drawing Sheets

VEHICLE SYSTEM WITH REMOTE OPERATION MODE TRANSITION CONTROL

CROSS-REFERENCE TO RELATED APPLICATION

This application claims priority to Japanese Patent Application No. 2023-061425 filed on Apr. 5, 2023, incorporated herein by reference in its entirety.

BACKGROUND

1. Technical Field

The present disclosure relates to a vehicle capable of autonomous driving.

2. Description of Related Art

Japanese Unexamined Patent Application Publication No. 2019-177808 (JP 2019-177808 A) discloses a vehicle equipped with an autonomous driving kit on a rooftop. The vehicle includes a built-in control device that performs autonomous driving control based on control information from the autonomous driving kit. The autonomous driving kit includes a computer in which autonomous driving control software is installed, a camera, and a sensor.

SUMMARY

It is presumed that JP 2019-177808 A suggests autonomous driving (automated driving of a vehicle alone). However, J P 2019-177808 A does not suggest or teach such a technical idea that the vehicle capable of autonomous driving can perform remote driving (automated driving based on signals from the outside of the vehicle) in addition to the autonomous driving.

The present disclosure has been made to solve the above problem, and an object of the present disclosure is to provide a vehicle that can appropriately perform both autonomous driving and remote driving.

A vehicle according to one embodiment of the present disclosure includes an autonomous driving system and a vehicle platform configured to control the vehicle based on a command from the autonomous driving system.

The autonomous driving system is configured to transmit, to the vehicle platform, a command for autonomous driving that is automated driving of the vehicle alone, and a command for remote driving that is automated driving based on a signal from an outside of the vehicle.

The vehicle is configured to operate in an automatic mode in which the vehicle platform is under control of the autonomous driving system or a manual mode in which the vehicle is under control of a driver.

When the vehicle is not performing the remote driving, switching to the remote driving is permitted in the manual mode and prohibited in the automatic mode.

According to the present disclosure, it is possible to provide the vehicle that can appropriately perform both the autonomous driving and the remote driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
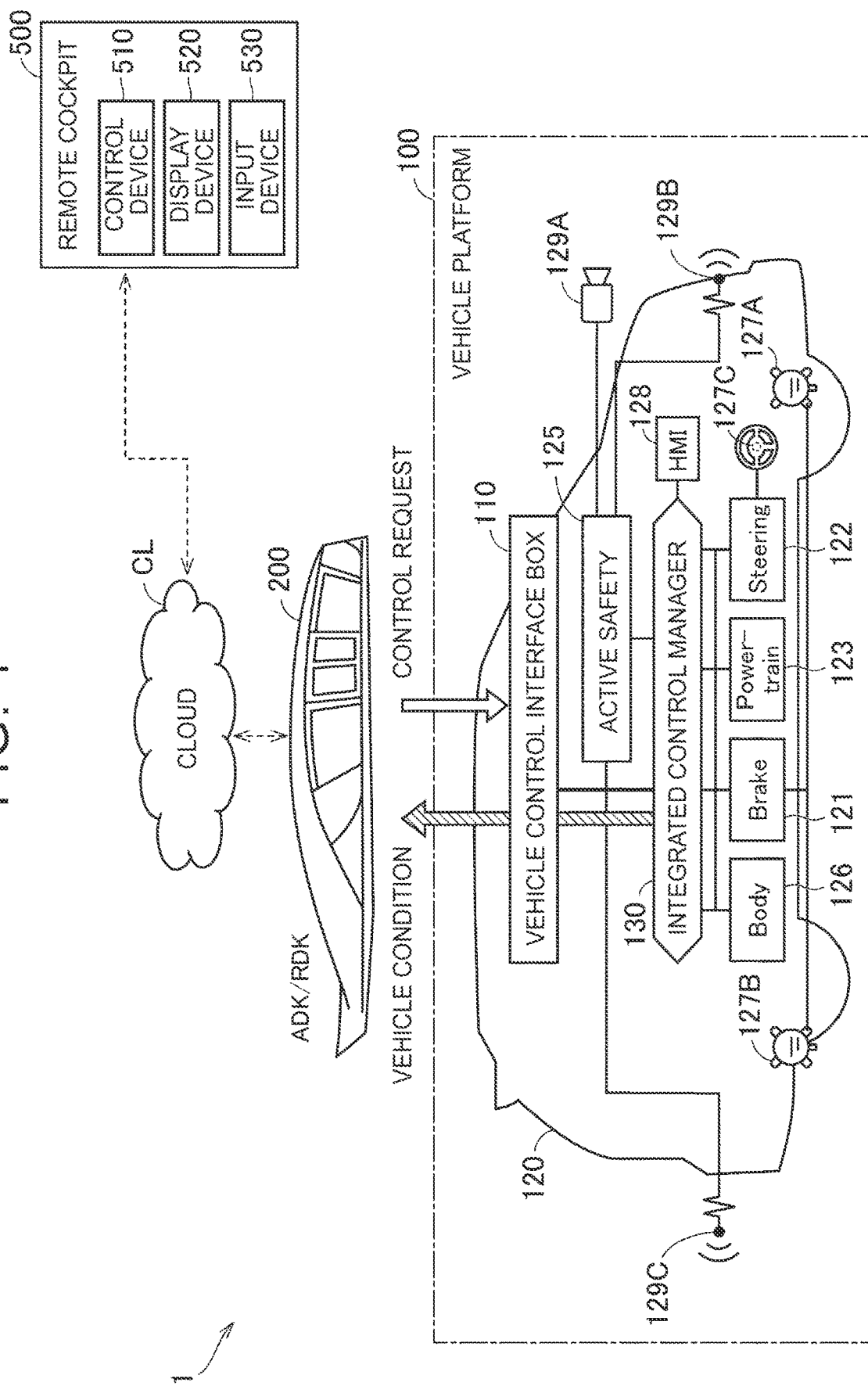
FIG. 1 is a diagram showing a schematic configuration of a vehicle according to an embodiment of the present disclosure.

Hereinafter, an embodiment of the present disclosure will be described in detail with reference to the drawings. In the drawings, the same or corresponding portions are denoted by the same reference signs and the description thereof will not be repeated.

FIG. 1 is a diagram showing a schematic configuration of a vehicle according to an embodiment of the present disclosure. Referring to FIG. 1, a vehicle 1 includes a VP (vehicle platform) 100 and an automatic driving module 200. The automatic driving module 200 includes an Autonomous Driving Kit (ADK) for autonomous driving (i.e., autonomous driving of a vehicle alone) and a Remote Driving Kit (RDK) for remote driving (i.e., automatic driving based on signals from outside the vehicle). In autonomous driving, the vehicle 1 can travel independently. According to autonomous driving, the vehicle 1 can run without receiving instructions from either the outside of the vehicle 1 or the person (driver) inside the vehicle. Autonomous driving may be automatic driving, which is generally referred to as "fully automatic driving." In remote driving, the vehicle 1 can run without receiving instructions from a person (driver) inside the vehicle. The vehicle 1 during remote operation may travel based on instructions from a device external to the vehicle, or may travel based on remote control by a person external to the vehicle. The travel plan for remote driving may be generated by the vehicle 1 based on a signal from outside the vehicle, or may be generated outside the vehicle 1 (for example, in the cloud CL). In this embodiment, the vehicle 1 generates a travel plan for automatic driving in both autonomous driving and remote driving.

The control system for the vehicle 1 according to this embodiment includes a remote cockpit 500 outside the vehicle 1. The remote cockpit 500 includes a control device 510, a display device 520 that displays the environment of the vehicle 1 (for example, the surrounding scenery and the road on which the vehicle is traveling), and an input device 530 that accepts a remote operation (for example, the driving operation for driving and the operation for the body system). The remote cockpit 500 may have a driver's seat similar to a typical vehicle. By using the remote cockpit 500, a user can monitor and operate the vehicle 1 from a remote location. Control device 510 of remote cockpit 500 communicates with vehicle 1 through a communication system (including cloud CL). Cloud CL has computer functionality and communicates with both remote cockpit 500 and vehicle 1. The cloud CL transmits a signal to the vehicle 1 based on the remote control of the input device 530. Cloud CL also transmits a signal based on information from vehicle 1 to remote cockpit 500. In this embodiment, a user (person) operates vehicle 1 through input device 530. However, the present disclosure is not limited to this, and AI (artificial intelligence) may remotely operate the vehicle 1 from outside the vehicle instead of a human. Note that the cloud CL may hold the latest map information and traffic information. Edge computing technology may be used to reduce the amount of data processed by cloud CL or to shorten delay time in remote operation.

VP 100 includes a vehicle control interface box (hereinafter referred to as "VCIB") 110 and a base vehicle 120. By adding VCIB 110 to base vehicle 120, VP 100 to which automatic driving module 200 can be attached and detached is formed. Then, the vehicle 1 is completed by attaching the automatic driving module 200 to the VP 100. VCIB 110 is configured to communicate with both base vehicle 120 and autonomous driving module 200 via a communication bus. In this embodiment, automatic driving module 200 is attached to the rooftop of base vehicle 120. However, the mounting position of the automatic driving module 200 can be changed as appropriate.

The base vehicle 120 is, for example, a commercially available electrified vehicle (xEV). In this embodiment, a battery electric vehicle (BEV) is employed as the base vehicle 120. However, the base vehicle 120 is not limited to this, and may be an xEV other than a BEV. The base vehicle 120 includes an integrated control manager 130, various systems and various sensors (wheel speed sensors 127A, 127B, steering angle sensor 127C, etc.) for controlling the base vehicle 120, and a Human Machine Interface (HMI) 12. The integrated control manager 130 functions as a control device. The integrated control manager 130 integrates and controls various systems related to the operation of the base vehicle 120 based on the detection results of the on-vehicle sensors. HMI 128 includes an input device and a notification device. HMI 128 may include a navigation system.

Figure 2:
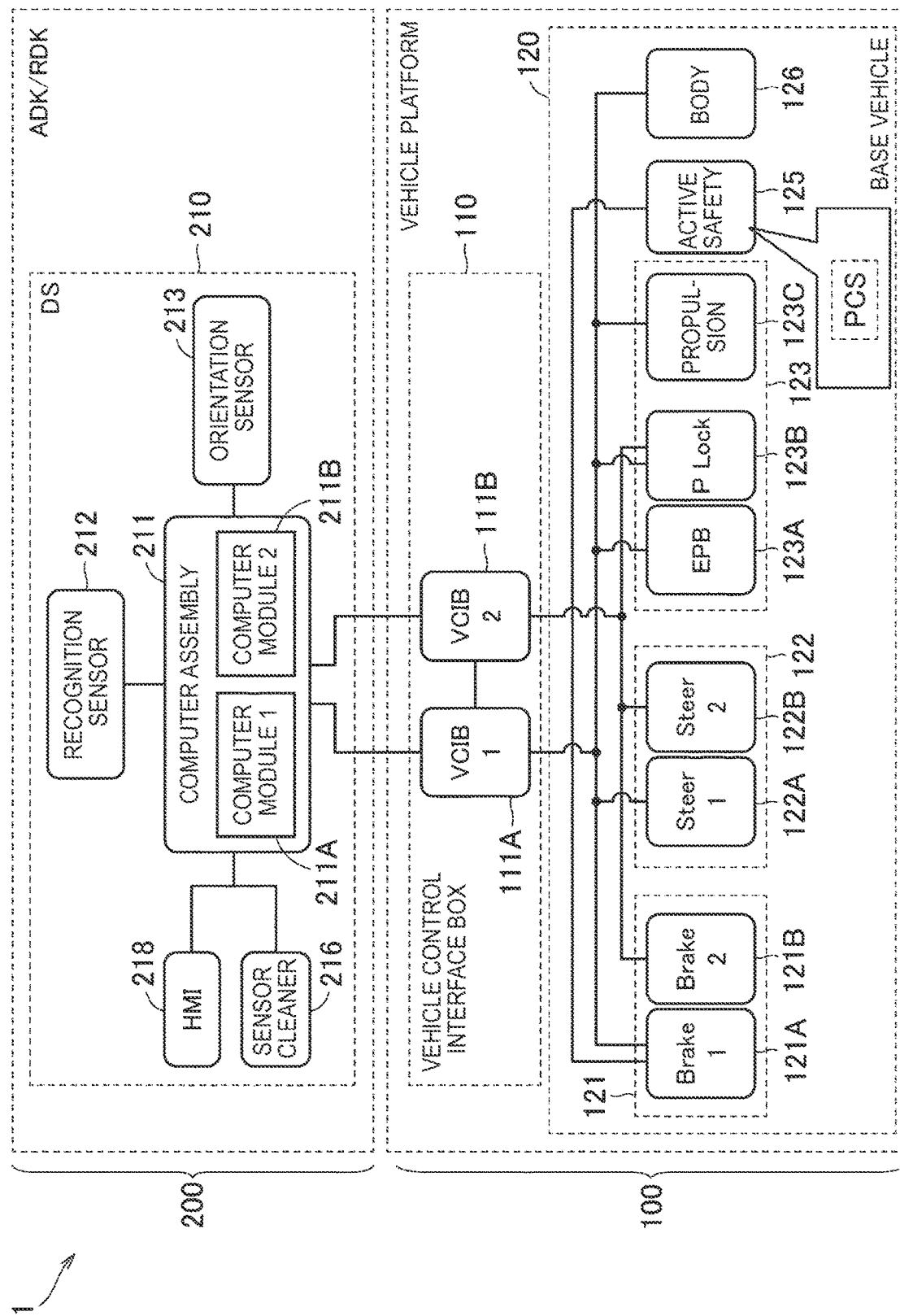
FIG. 2 is a diagram showing a control system inside a vehicle according to an embodiment of the present disclosure.

FIG. 2 is a diagram showing the internal control system of the vehicle 1. Referring to FIG. 2 together with FIG. 1, the automatic driving module 200 includes an autonomous driving system (hereinafter referred to as "DS") 210 for automatically driving the vehicle 1. The DS 210 includes a computer assembly (hereinafter referred to as "DSCOM") 211, a recognition sensor 212, a posture sensor 213, a sensor cleaner 216, and a Human Machine Interface (HMI) 218.

The DSCOM 211 includes a first computer module (hereinafter referred to as "first CM") 211A and a second computer module (hereinafter referred to as "second CM") 211B. Each of the first CM 211A and the second CM 211B includes a processor and a storage device that stores automatic driving software using an API, which will be described later, and is configured such that the processor can execute the automatic driving software. The DSCOM 211 switches between autonomous operation and remote operation according to the value of the driving ID, which will be described later. Specifically, the DSCOM 211 outputs a command regarding autonomous driving if the value of the driving ID is "ADK", and outputs a command regarding remote driving if the value of the driving ID is "RDK". Commands from DSCOM 211 are sent to VP 100 through VCIB 110. Each of the first CM 211A and the second CM 211B may include only one processor, or may separately include an autonomous driving processor and a remote driving processor. The communication bus that connects the DSCOM 211 and the VCIB 110 may be a common bus for autonomous operation and remote operation, or the autonomous operation bus and the remote operation bus may be provided separately.

The recognition sensor 212 includes a sensor that acquires information indicating the external environment of the vehicle 1 (environmental information). The recognition sensor 212 may include at least one of a camera, a millimeter wave radar, and a lidar. The posture sensor 213 acquires information regarding the posture of the vehicle 1 (posture information). Attitude sensor 213 may include various sensors that detect acceleration, angular velocity, and position of vehicle 1. HMI 218 includes input devices and notification devices.

The base vehicle 120 includes a brake system 121, a steering system 122, a powertrain system 123, an active safety system (hereinafter referred to as "prevention system") 125, and a body system 126. In this embodiment, each system includes an electronic control unit (hereinafter also referred to as "ECU").

In the vehicle 1, a control system related to the behavior of the vehicle 1 (running, stopping, turning) has redundancy. The first CM 211A and the second CM 211B give instructions to the main control system and sub control system, respectively. The VCIB 110 includes a main control system control section (hereinafter referred to as "first VCIB") 111A and a sub control system control section (hereinafter referred to as "second VCIB") 111B. Each control unit may include a computer including a processor and a storage device. The first VCIB 111A and the second VCIB 111B may communicate with each system directly or via the integrated control manager 130 shown in FIG. 1.

Brake system 121 includes a braking mechanism, an operation section that receives a brake operation from a driver, and brake control sections 121A and 121B. Steering system 122 includes a steering mechanism, an operation section that accepts steering operations from the driver, and steering control sections 122A and 122B. Powertrain system 123 includes a shift device, a vehicle drive device, an EPB device, a P-Lock device, an EPB control section 123A, a P-Lock control section 123B, and a propulsion control section 123C. "EPB" means electric parking brake, and "P-Lock" means parking lock. The shift device determines a shift range and switches the propulsion direction and shift mode of base vehicle 120 according to the determined shift range. In addition to the transmission mechanism, the shift device further includes an operation section that receives a shift operation from the driver. The vehicle drive device includes a battery, a driving motor that receives power from the battery, and an operation section that accepts an accelerator operation from a driver, and applies propulsive force in a propulsion direction indicated by a shift range. In addition to the parking lock mechanism and actuator, the P-Lock device further includes an operation section that accepts a parking operation from the driver.

Preventive system 125 includes a Pre Collision Safety (PCS) system. The PCS system prevents a collision when it is determined that there is a risk of collision regarding the vehicle 1. The ECU of the prevention system 125 determines the possibility of a collision for the vehicle 1 while it is running. The base vehicle 120 includes a camera 129A and radar sensors 129B and 129C (FIG. 1) for detecting collision risk. The ECU of the prevention system 125 uses signals received from the camera 129A and radar sensors 129B, 129C to determine whether there is a risk of collision. If it is determined that there is a risk of collision, the ECU activates the PCS. This causes the PCS system to initiate a warning in the direction in which a collision risk is detected.

If the risk of collision cannot be avoided by manual driving, the PCS system sequentially executes prefill control, braking control, and brake hold control. Prefill control is a control that applies hydraulic pressure to the extent that the clearance between the brake pad and the rotor is clogged before braking control to hasten the rise in brake deceleration. When the brake hold control is completed, the alarm stops and the EPB device is activated. The PCS system will continue to issue alerts until the risk of collision has disappeared. When the risk of collision disappears, the PCS becomes stopped (inactive).

In this embodiment, various control devices included in base vehicle 120 function individually or in cooperation as a "first control device" according to the present disclosure. The DSCOM 211 (including the first CM 211A and the second CM 211B) functions as a "second control device" according to the present disclosure. Further, each of the first VCIB 111A and the second VCIB 111B functions as a "third control device" according to the present disclosure.

In this embodiment, signals defined by an Application Program Interface (API) (API signals) are used for communication between the DS 210 and the VCIB 110. DS 210 is configured to process various signals defined by the API. The DS 210 outputs various commands to the VCIB 110 according to the API. In the following, each of the above various commands output from the DS 210 to the VCIB 110 is also referred to as an "API command." Further, the DS 210 receives various signals indicating the status of the base vehicle 120 from the VCIB 110 according to the above API. In the following, each of the above various signals that the DS 210 receives from the VCIB 110 will also be referred to as "API status." Both API commands and API status correspond to API signals.

In this embodiment, DS 210 uses API commands described below. A vehicle mode command is an API command that requests a transition to automatic mode or manual mode. The automatic mode and manual mode will be described later. The propulsion direction command is an API command that requests switching of the shift range (R/D). The acceleration command is an API command that instructs the acceleration of the vehicle. The acceleration command requests acceleration (+) and deceleration (−) in the direction indicated by the propulsion direction status, which will be described later. An immobilization command is an API command that requests the application or removal of immobilization. Application of immobilization means turning on the EPB (operating state) and setting the shift range to P (parking).

Some API commands used in the vehicle 1 have been described above. VCIB 110 receives various API commands from DS 210. When VCIB 110 receives an API command from DS 210, it converts the API command into a signal format that can be executed by the controller of base vehicle 120. Hereinafter, the API command converted into a signal format executable by the control device of the base vehicle 120 will also be referred to as an "internal command." When VCIB 110 receives an API command from DS 210, it outputs an internal command corresponding to the API command to base vehicle 120.

Next, API status will be explained. The DS 210 grasps the state of the base vehicle 120 using, for example, the API status described below.

The vehicle mode status is an API status indicating the vehicle mode state. Vehicle modes include manual mode and automatic mode. Manual mode is a vehicle mode in which the vehicle is under the control of a driver (human). Auto mode is a vehicle mode in which the vehicle platform (including the base vehicle) is under the control of an autonomous driving kit. In the initial state, the vehicle mode is manual mode. The driver can select a desired vehicle mode through the in-vehicle HMI. The vehicle mode status outputs the corresponding values "0" and "1" when the current vehicle mode is manual mode or automatic mode, respectively. In this embodiment, automatic mode is one mode. However, a first automatic mode for autonomous operation and a second automatic mode for remote operation may be provided separately. Moreover, the vehicle mode may further include other modes. The vehicle mode may further include a standby mode in which movement of the vehicle is prohibited.

The propulsion direction status is an API status indicating the current shift range. The traveling direction status is an API status indicating the traveling direction of the vehicle. The traveling direction status outputs a value of "0" when the vehicle is moving forward, a value of "1" when the vehicle is moving backward, and a value of "2" when all wheels (four wheels) exhibit a speed of "0" for a certain period of time. The vehicle speed status is an API status indicating the longitudinal speed of the vehicle, and outputs the absolute value of the vehicle speed. Immobilization status is an API status that indicates the state of immobilization (e.g., the state of EPB and shift P).

The driving identification status (hereinafter referred to as "driving ID") indicates that the communication between the DS 210 (DSCOM 211) and the VCIB 110 (first VCIB 111A and second VCIB 111B) is for autonomous driving and for remote driving. This is the API status indicating whether it is communication or not. The driving ID outputs the value "ADK" during autonomous driving and the value "RDK" during remote driving. Such a driving ID makes it easier to achieve both autonomous driving and remote driving.

Some API statuses used in the vehicle 1 have been described above. The VCIB 110 receives various sensor detection values and status determination results from the base vehicle 120 and outputs various API statuses indicating the status of the base vehicle 120 to the DS 210. The VCIB 110 obtains an API status in which a value indicating the state of the base vehicle 120 is set, and outputs the obtained API status to the DS 210.

Figure 3:
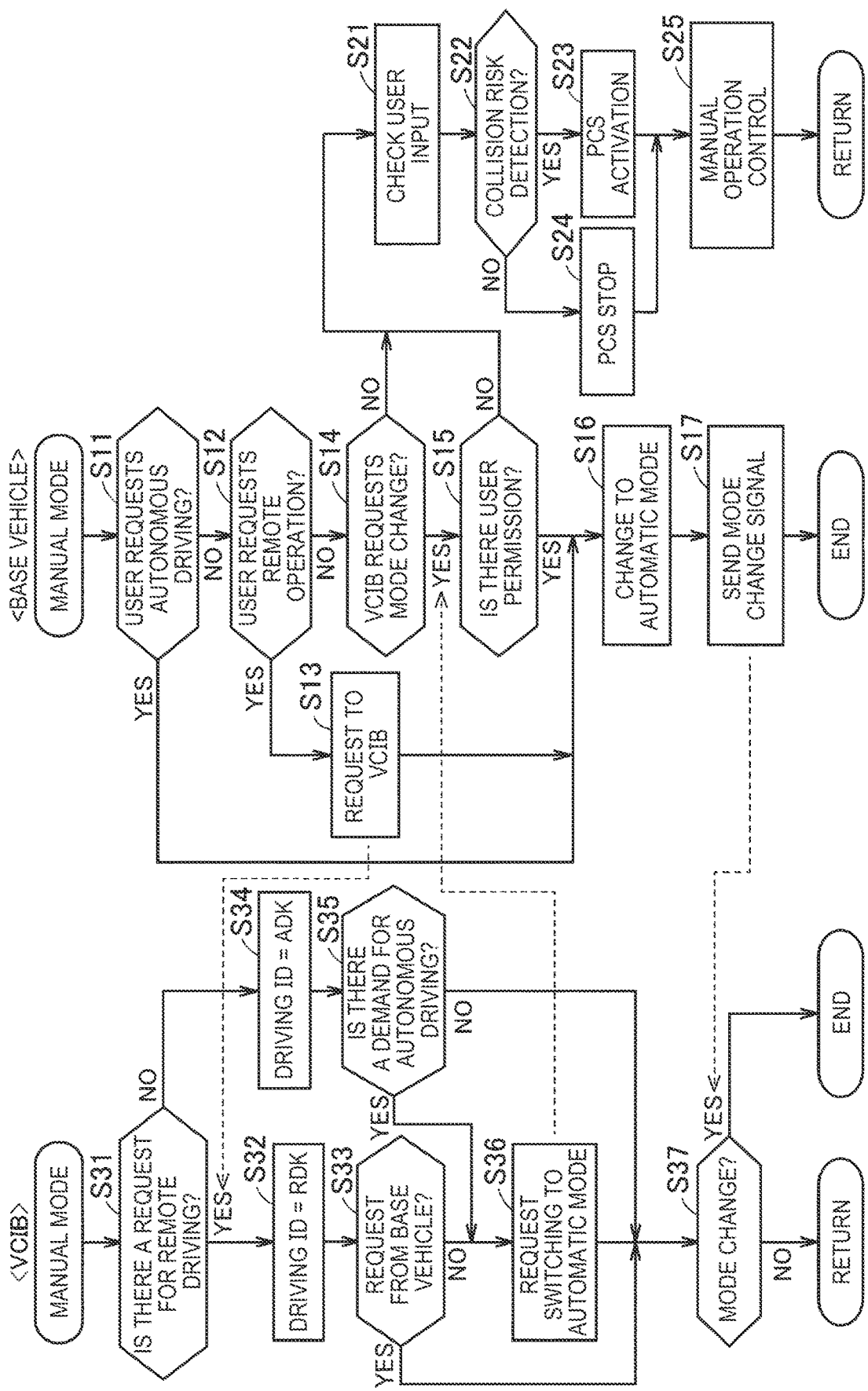
FIG. 3 is a flowchart for explaining control in manual mode in vehicle control according to an embodiment of the present disclosure.

FIG. 3 is a flowchart for explaining control of the vehicle 1 in manual mode. Each step in the flowchart is simply written as "S". Hereinafter, a series of processes from S11 to S17 and S21 to S25 in FIG. 3 executed by base vehicle 120 in manual mode will also be referred to as "S11 flow". The S11 flow is executed by one of the plurality of control devices included in the base vehicle 120 (for example, the integrated control manager 130 and the control devices of each system shown in FIGS. 1 and 2). Further, the series of processes from S31 to S37 executed by the VCIB 110 in manual mode is also referred to as "S31 flow". The S31 flow is basically executed by the first VCIB 111A. However, if an abnormality occurs in the first VCIB 111A, the second VCIB 111B executes each process instead of the first VCIB 111A.

Referring to FIG. 3, the S11 flow starts from S11. In S11, the base vehicle 120 determines whether or not a request for autonomous driving has been received from the user. If it is determined that a request for autonomous driving has not been received (NO in S11), base vehicle 120 determines in S12 whether or not a request for remote driving has been received from the user. The user (driver) can select either autonomous operation or remote operation and request the base vehicle 120 to perform the operation through the HMI 128.

If the user requests remote operation (YES in S12), the process advances to S16 after requesting remote operation to the VCIB 110 in S13. If the user requests autonomous driving (YES in S11), the base vehicle 120 advances the process to S16 without making the request in S13. If the user does not request either remote driving or autonomous driving (NO in both S11 and S12), the base vehicle 120 determines whether switching to the vehicle mode (switching from the manual mode to the automatic mode) from the VCIB 110 is requested in S14. If the VCIB 110 requests the base vehicle 120 to switch to the automatic mode through the process of S36, which will be described later, YES is determined in S14, and the process proceeds to S15.

In S15, the base vehicle 120 determines whether the user has authorized switching to automatic mode. Specifically, the base vehicle 120 controls the HMI 128 to prompt the user to input either permission or denial regarding switching to automatic mode. The HMI 128 may display an input screen that notifies the user that switching to automatic mode has been requested, and accepts permission/rejection input from the user. If the user makes an input to the HMI 128 indicating permission, YES is determined in S15, and the process proceeds to S16. If the user inputs an input indicating refusal to the HMI 128, the determination in S15 is NO, and the process proceeds to S21. Further, if all of S11, S12, and S14 are determined to be NO, the process proceeds to S21.

In S21, the base vehicle 120 confirms various user inputs to the vehicle 1 from the user. The user input includes an operation for manual driving by the driver. In the following S22, the prevention system 125 determines whether there is a risk of collision. If there is a collision risk (YES in S22), the PCS is activated in S23, and if there is no collision risk (NO in S22), the PCS is stopped in S24. After that, the process proceeds to S25. In S25, the base vehicle 120 performs manual driving control of the vehicle 1 according to the driver's driving operations (for example, acceleration/deceleration operations and steering) confirmed in S22. After the process of S25 is executed, the process returns to the first step (S11). In manual mode, manual operation control (S25) is continuously executed while all of S11, S12, and S14 are determined to be NO.

On the other hand, if YES is determined in any of S11, S12, and S15, the process in S16 is executed. In S16, the base vehicle 120 changes the vehicle mode of the vehicle 1 to automatic mode. Subsequently, in S17, a signal indicating that the vehicle mode has been changed from manual mode to automatic mode (hereinafter referred to as "first mode change signal") is transmitted from base vehicle 120 to VCIB 110. When the process of S17 is executed, the S11 flow ends.

On the other hand, the S31 flow starts from S31. In S31, the VCIB 110 determines whether a request for remote operation has been received. DSCOM 211 receives requests for remote driving from each of base vehicle 120 and DS 210. For example, when the base vehicle 120 requests remote driving from the VCIB 110 through the process in S13 above, YES is determined in S31. Also, when the VCIB 110 receives a request for remote operation from the DSCOM 211, YES is determined in S31. When the DSCOM 211 receives a request for remote driving from outside the vehicle (for example, the remote cockpit 500 shown in FIG. 1), it requests the VCIB 110 to perform the remote driving. A remote user can request remote operation of the VCIB 110 through the input device 530.

If the VCIB 110 receives a request for remote operation (YES at S31), the VCIB 110 sets "RDK" to the driving ID at S32. Subsequently, the VCIB 110 determines whether the remote driving request is from the base vehicle 120 in S33. If the VCIB 110 receives a request for remote driving from a vehicle other than the base vehicle 120 (for example, the DS 210) (NO in S33), the process proceeds to S36.

If the VCIB 110 has not received a request for remote driving (NO in S31), the VCIB 110 sets "ADK" to the driving ID in S34. Subsequently, in S35, the VCIB 110 determines whether a request for autonomous driving has been received from the DS 210 (DSCOM 211). The DSCOM 211 may request autonomous driving from the VCIB 110 when determining that switching to autonomous driving is necessary based on the situation of the vehicle 1. DSCOM 211 can request autonomous driving (transition to automatic mode) from VCIB 110 using vehicle mode commands. If the VCIB 110 receives a request for autonomous driving (YES in S35), the process proceeds to S36.

In S36, the VCIB 110 requests the base vehicle 120 to switch the vehicle mode (transition to automatic mode). After that, the process advances to S37. Note that when the VCIB 110 receives a request for remote driving (S13) from the base vehicle 120 (YES at S33), and when the VCIB 110 has not received a request for either remote driving or autonomous driving (NO in both S31 and S35), the process proceeds to S37 without requesting S36.

In S37, the VCIB 110 determines whether the vehicle mode has been changed from manual mode to automatic mode. In this embodiment, the VCIB 110 determines whether the vehicle mode has been changed to the automatic mode based on whether the first mode change signal (S17) has been received from the base vehicle 120. If the vehicle mode remains in manual mode (NO in S37), the process returns to the first step (S31). If the vehicle mode is changed to automatic mode (YES in S37), the S31 flow ends.

Figure 4:
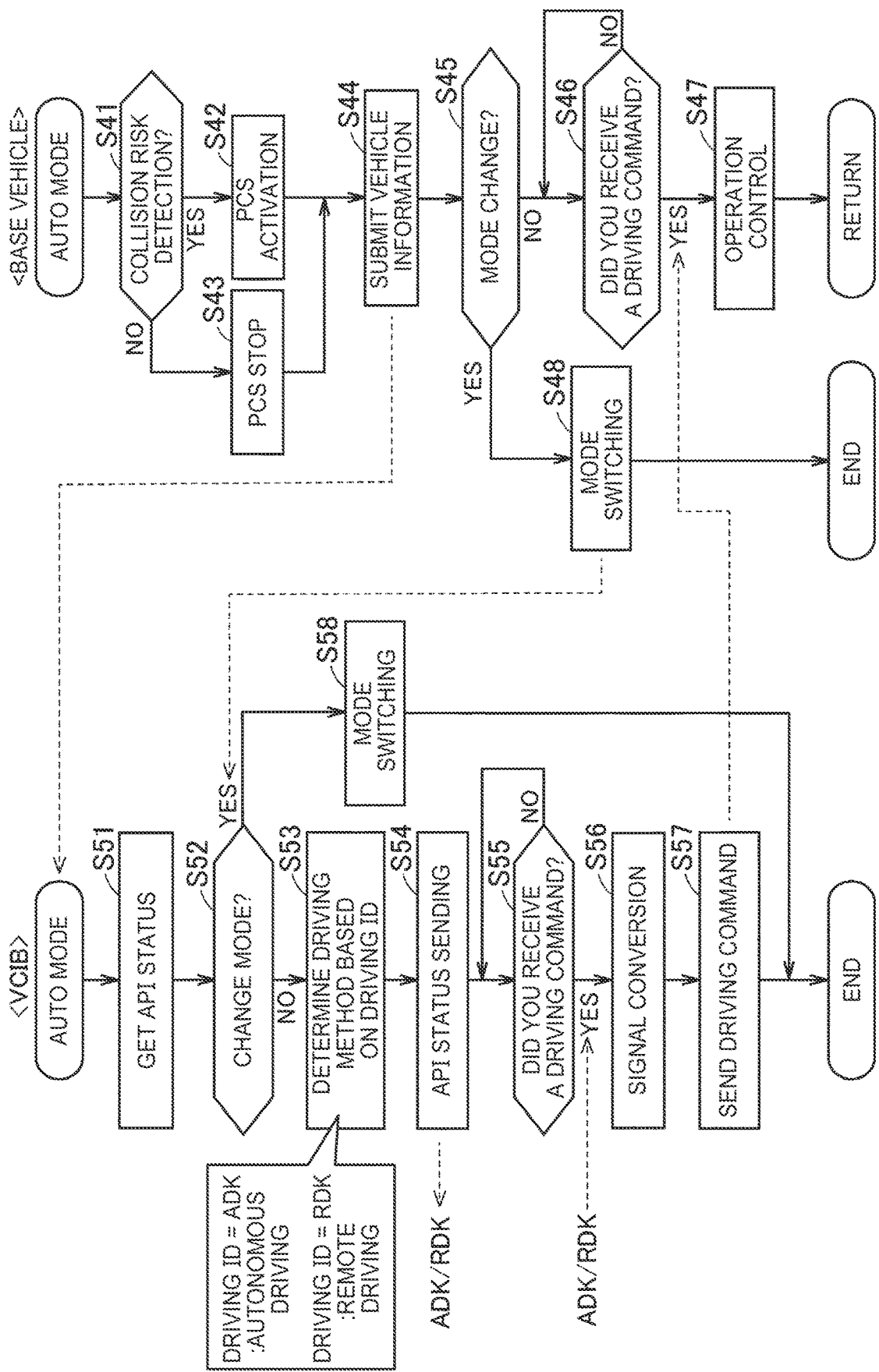
FIG. 4 is a flowchart for explaining control in automatic mode in vehicle control according to an embodiment of the present disclosure.

FIG. 4 is a flowchart for explaining control of the vehicle 1 in automatic mode. Hereinafter, the series of processes from S41 to S48 in FIG. 4 executed by the base vehicle 120 in automatic mode will also be referred to as "S41 flow". The S41 flow is executed by one of the plurality of control devices included in the base vehicle 120. Further, the series of processes from S51 to S58 executed by the VCIB 110 in automatic mode is also referred to as "S51 flow". The S51 flow is basically executed by the first VCIB 111A. However, if an abnormality occurs in the first VCIB 111A, the second VCIB 111B executes each process instead of the first VCIB 111A.

Referring to FIG. 4, the S41 flow starts from S41. In S41, the prevention system 125 determines whether there is a risk of collision. If there is a risk of collision (YES in S41), the PCS is activated in S42, and if there is no risk of collision (NO in S41), the PCS is stopped in S43. After that, the process advances to S44. In S44, the base vehicle 120 obtains current vehicle information and transmits the obtained vehicle information to the VCIB 110. The current vehicle information includes information indicating that the vehicle mode is automatic mode, various sensor detection values indicating the current state of the base vehicle 120, and state determination results based on user operations or sensor detection values. In addition, the current vehicle information further includes information indicating the state of the prevention system 125 (PCS, etc.). The base vehicle 120 may store the current vehicle information in a storage device in association with the acquisition time.

In subsequent S45, the base vehicle 120 determines whether a request for manual driving has been received from the user (driver). A user (driver) can request manual operation of the base vehicle 120 through the HMI 128. If it is determined that a request for manual driving has been received (YES in S45), the base vehicle 120 starts control in manual mode (flow in S11 in FIG. 3) in S48, and transmits a signal indicating that the vehicle mode is changed from the automatic mode to the manual mode (hereinafter referred to as "second mode change signal") to VCIB 110. When the process of S48 is executed, the flow of S41 ends.

If it is determined that a request for manual driving has not been received (NO in S45), the base vehicle 120 waits for an automatic driving command (command for autonomous driving or remote driving) from the DS 210 in S46. Then, when the base vehicle 120 receives the automatic driving command through the process of S57 (described later) (YES at S46), the base vehicle 120 performs automatic driving control (autonomous driving control or remote driving control) according to the received automatic driving command in the subsequent S47. Through the process of S47, automatic driving of the vehicle 1 is executed. After that, the process returns to the first step S41. In automatic mode, automatic operation control (S47) is continuously executed.

When the VCIB 110 receives the current vehicle information (S44) from the base vehicle 120, it starts the S51 flow. First, in S51, the VCIB 110 acquires the API status (for example, the various API statuses described above) indicating the current state of the base vehicle 120 based on the received vehicle information. VCIB 110 may determine values for various API statuses based on various sensor detection values. The VCIB 110 may store the acquired values of various API statuses in a storage device in association with the acquisition time. In subsequent S52, the VCIB 110 determines whether the vehicle mode has been changed from automatic mode to manual mode. In this embodiment, VCIB 110 determines whether the vehicle mode has been changed to manual mode based on whether it has received the second mode change signal (S48) from base vehicle 120. If the vehicle mode is changed to manual mode (YES in S52), the VCIB 110 starts control in manual mode (S31 flow in FIG. 3) in S58, and S51 flow ends.

If the vehicle mode remains in the automatic mode (NO in S52), the VCIB 110 determines which communication for autonomous driving and communication for remote driving with the DSCOM 211 is performed based on the driving ID value in the following S53. Then, in subsequent S54, the VCIB 110 executes communication for the automatic driving method (autonomous driving/remote driving) determined in S53. Specifically, the value of the driving ID is set in manual mode (see S32 and S34 in FIG. 3). In automatic mode, the value of the driving ID set most recently is maintained. If the driving ID indicates "ADK" in S53, the VCIB 110 and the DSCOM 211 start communication for autonomous driving in S54. On the other hand, if the driving ID indicates "RDK" in S53, the VCIB 110 and DSCOM 211 start communication for remote operation in S54. In S54, the VCIB 110 transmits the various API statuses (including the driving ID) acquired in S51 to the DSCOM 211.

As described above, when the VCIB 110 is changed to the automatic mode without receiving a request for remote driving, the VCIB 110 performs communication for autonomous driving with the DSCOM 211 (see S31 and S34 in FIG. 3). Such a configuration suppresses interference between the command for autonomous driving and the command for remote driving, making it easier for the vehicle 1 to appropriately perform autonomous driving. Further, when the VCIB 110 receives a request for remote driving in the manual mode (S31, S32 in FIG. 3), the VCIB 110 requests the control device of the base vehicle 120 to switch to the automatic mode (S36 in FIG. 3), and starts communication for remote operation with the DSCOM 211 based on the reply from the control device of the base vehicle 120 (S17 in FIG. 3). Such a configuration makes it easier for the vehicle 1 to appropriately perform remote driving as needed.

When the DSCOM 211 receives the above API status from the VCIB 110, it creates a travel plan for automatic driving (autonomous driving/remote driving) according to the driving ID. In automatic mode, DSCOM 211 obtains environmental and attitude information from various sensors. Regarding remote operation, DSCOM 211 further obtains signals based on remote operation from remote cockpit 500. The DSCOM 211 creates a travel plan based on various information and determines values of various API commands in order to realize the travel plan. DSCOM 211 sends the obtained API commands (including automatic driving instructions for base vehicle 120) to VCIB 110.

The VCIB 110 waits for an API command from the DSCOM 211 in S55, and upon receiving the API command (YES in S55), converts each received API command into an internal command in S56. As a result, internal commands corresponding to each API command are obtained. In subsequent S57, VCIB 110 transmits the obtained internal command to base vehicle 120. When the process of S57 is executed, the flow of S51 ends. However, the S51 flow is initiated each time the VCIB 110 receives vehicle information (S44) from the base vehicle 120.

As described above, in automatic mode, VCIB 110 receives a command regarding either autonomous driving or remote driving from DSCOM 211, and outputs a signal based on the received command to the control device of base vehicle 120. By providing the vehicle 1 with the VCIB 110, it becomes easier to appropriately transmit commands from the DSCOM 211 to the base vehicle 120.

As described above, the vehicle 1 according to this embodiment includes the DS 210 (autonomous driving system) and the VP 100 (vehicle platform) that controls the vehicle 1 according to commands from the DS 210. DS 210 is configured to send commands for autonomous driving and commands for remote driving to VP 100. Vehicle 1 is configured to be operable in automatic mode and manual mode. When the vehicle 1 is not in remote operation, switching to remote operation is permitted in manual mode and prohibited in automatic mode.

If switching to remote driving is allowed in automatic mode, there is a possibility that switching from autonomous driving to remote driving will occur unintentionally in automatic mode. In this regard, according to the processes shown in FIGS. 3 and 4, switching to remote operation is permitted in manual mode and prohibited in automatic mode. Specifically, the driving ID can be changed in manual mode (FIG. 3). On the other hand, in automatic mode (FIG. 4), the driving ID is not changed. This prevents unintended switching to remote operation. According to the above configuration, it becomes easier for the vehicle 1 to appropriately perform both autonomous driving and remote driving.

In the embodiment described above, the VCIB 110 receives requests for switching to remote driving (remote driving requests) from both the base vehicle 120 and the DS 210, but the present disclosure is not limited to this form.

Figure 5:
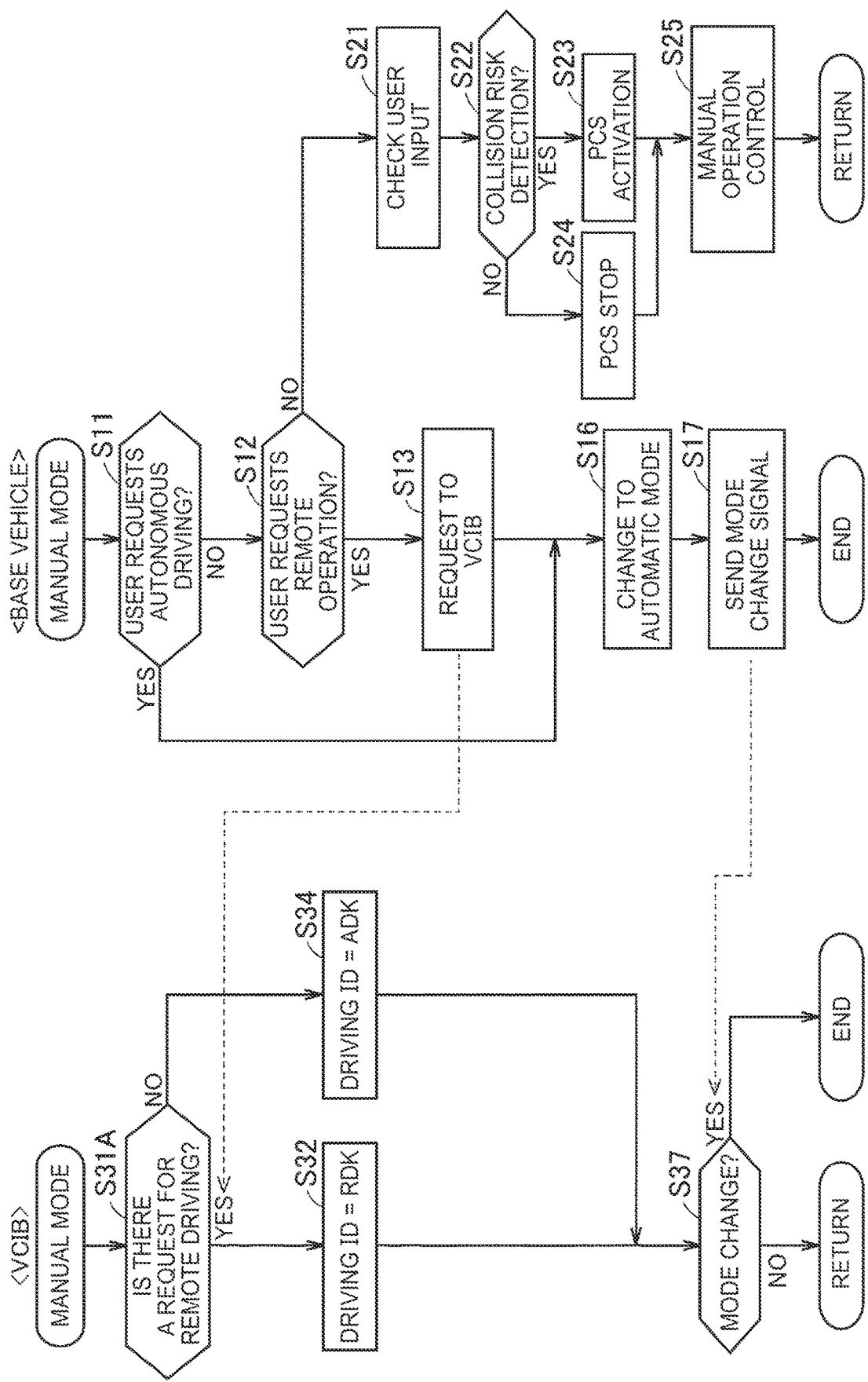
FIG. 5 is a flowchart showing a first modification of the process shown in FIG. 3.

FIG. 5 is a flowchart showing a first modification of the process shown in FIG. 3. In the first modification, the VCIB 110 accepts remote driving requests from the base vehicle 120, but does not accept remote driving requests from the DS 210. The base vehicle 120 makes a remote driving request to the VCIB 110, for example, in response to a request from a user (driver) inside the vehicle. In the process shown in FIGS. 5, S14, S15, S33, S35, and S36 are omitted from the process shown in FIG. 3, and S31A is adopted in place of S31 (FIG. 3). In S31A, the VCIB 110 determines whether a remote driving request has been received from the base vehicle 120.

Figure 6:
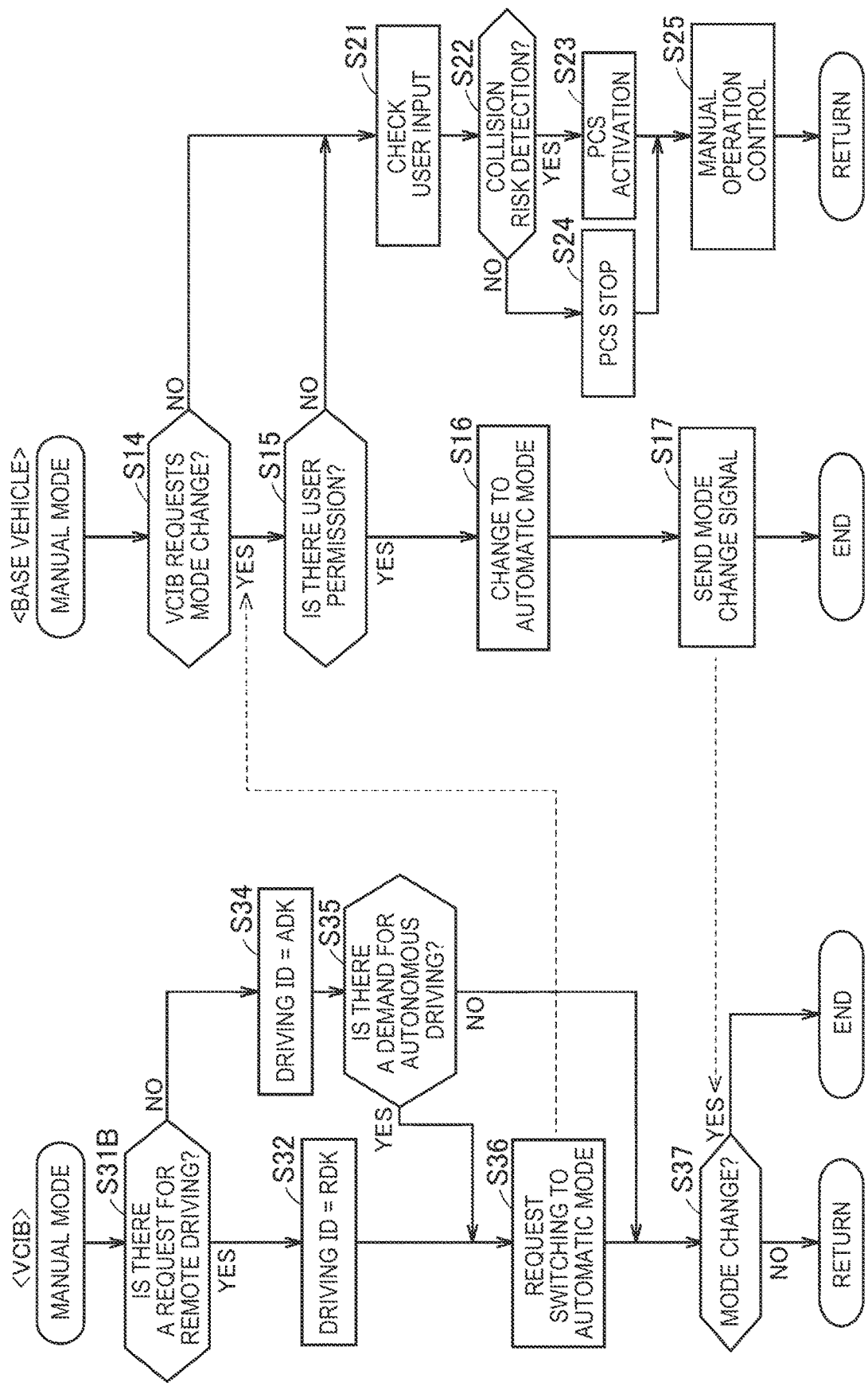
FIG. 6 is a flowchart showing a second modification of the process shown in FIG. 3.

FIG. 6 is a flowchart showing a second modification of the process shown in FIG. 3. In the second modification, VCIB 110 accepts remote driving requests from DS 210, but does not accept remote driving requests from base vehicle 120. The DS 210 issues a remote operation request to the VCIB 110 in response to a request from a remote cockpit 500 outside the vehicle, for example. In the process shown in FIGS. 6, S11 to S13 and S33 are omitted from the process shown in FIG. 3, and S31B is adopted in place of S31 (FIG. 3). In S31B, the VCIB 110 determines whether a remote operation request has been received from the DS 210.

The embodiments disclosed this time should be considered to be illustrative in all respects and not restrictive. The technical scope indicated by the present disclosure is indicated by the claims rather than the description of the embodiments described above, and is intended to include meanings equivalent to the claims and all changes within the scope. be done.

What is claimed is:

1. A vehicle comprising an autonomous driving system and a vehicle platform configured to control the vehicle based on a command from the autonomous driving system, wherein
    the autonomous driving system is configured to transmit, to the vehicle platform, a command for autonomous driving that is automated driving of the vehicle alone, and a command for remote driving that is automated driving based on a signal from an outside of the vehicle,
    the vehicle is configured to operate in an automatic mode in which the vehicle platform is under control of the autonomous driving system or a manual mode in which the vehicle is under control of a driver, and
    when the vehicle is not performing the remote driving, switching to the remote driving is permitted in the manual mode and prohibited in the automatic mode.

2. The vehicle according to claim 1, wherein:
    the vehicle platform includes a base vehicle including a first control device;
    the autonomous driving system includes a second control device configured to output commands related to the autonomous driving and the remote driving;
    the vehicle platform further includes a vehicle control interface box including a third control device configured to communicate with both the first control device and the second control device; and
    the third control device is configured to, in the automatic mode, receive a command related to the autonomous driving or the remote driving from the second control device, and output a signal based on the received command to the first control device.

3. The vehicle according to claim 2, wherein the third control device is configured to perform communication for the autonomous driving with the second control device when a change is made to the automatic mode without receiving a request for the remote driving.

4. The vehicle according to claim 3, wherein the third control device is configured to, when the request for the remote driving is received in the manual mode, request the first control device to switch to the automatic mode, and start communication for the remote driving with the second control device based on a reply from the first control device.

5. The vehicle according to claim 2, wherein:
    the first control device is configured to transmit vehicle information related to the base vehicle to the third control device;
    an application program interface signal defined in an application program interface is used for communication between the second control device and the third control device;
    the application program interface signal includes an application program interface command indicating a command for the base vehicle, and an application program interface status indicating a status of the base vehicle;
    the third control device is configured to convert the application program interface command from the second control device into a signal executable by the first control device, and transmit the converted signal to the first control device;
    the third control device is configured to acquire the application program interface status by using the vehicle information from the first control device, and transmit the acquired application program interface status to the second control device; and
    the application program interface status includes a signal indicating whether the communication between the second control device and the third control device is communication for the autonomous driving or communication for the remote driving.

* * * * *